(12) United States Patent
Allen et al.

(10) Patent No.: US 7,291,413 B2
(45) Date of Patent: Nov. 6, 2007

(54) FUEL CELL END PLATE

(75) Inventors: Jeffrey P. Allen, Naugatuck, CT (US); Peter W. Allen, Southbury, CT (US)

(73) Assignee: GenCell Corporation, Southbury, CT (US)

( * ) Notice: Subject to any disclaimer, the term of this patent is extended or adjusted under 35 U.S.C. 154(b) by 530 days.

(21) Appl. No.: 10/755,772

(22) Filed: Jan. 12, 2004

(65) Prior Publication Data

US 2004/0142223 A1    Jul. 22, 2004

Related U.S. Application Data

(60) Provisional application No. 60/439,156, filed on Jan. 10, 2003.

(51) Int. Cl.
  *H01M 2/00* (2006.01)
  *H01M 2/14* (2006.01)
(52) U.S. Cl. .......................................... 429/34; 429/38
(58) Field of Classification Search ...................... None
  See application file for complete search history.

(56) References Cited

U.S. PATENT DOCUMENTS

| | | | |
|---|---|---|---|
| 6,277,339 B1 | 8/2001 | Boneberg et al. | 422/198 |
| 6,372,372 B1 | 4/2002 | D'Aleo | 429/34 |
| 6,428,921 B1 * | 8/2002 | Grot | 429/37 |
| 6,670,069 B2 | 12/2003 | Allen | 429/37 |
| 6,686,080 B2 * | 2/2004 | Farkash et al. | 429/26 |
| 2001/0046619 A1 | 11/2001 | Allen | 429/37 |
| 2003/0082428 A1 * | 5/2003 | Boneberg et al. | 429/34 |

FOREIGN PATENT DOCUMENTS

| | | |
|---|---|---|
| DE | 100 49 801 | 4/2001 |
| EP | 1 094 536 | 4/2001 |
| JP | 11 097054 | 4/1999 |

OTHER PUBLICATIONS

English abstract of DE 100 49 801.
English abstract of JP 11 097054.

* cited by examiner

*Primary Examiner*—Dah Wei Yuan
*Assistant Examiner*—Katie O'Neill
(74) *Attorney, Agent, or Firm*—Banner & Witcoff, Ltd.

(57) ABSTRACT

A fuel cell end plate configured to transmit substantially constant compressive forces along a surface of a fuel cell is provided. The fuel cell end plate is configured such that the compressive force is substantially constant along the surface of the fuel cell even when the surface of the fuel cell is non-parallel. The fuel cell end plate is also configured such that the surfaces of the end plate remain substantially parallel when the fuel cell end plate is in contact with a non-parallel surface of a fuel cell or fuel cell stack. The fuel cell end plate is also configured to act as a distribution manifold for the distribution of reactants and coolants to the fuel cell stack. Fuel cell assemblies including the fuel cell end plate and methods of assembling the fuel cell end plate are also disclosed.

2 Claims, 7 Drawing Sheets

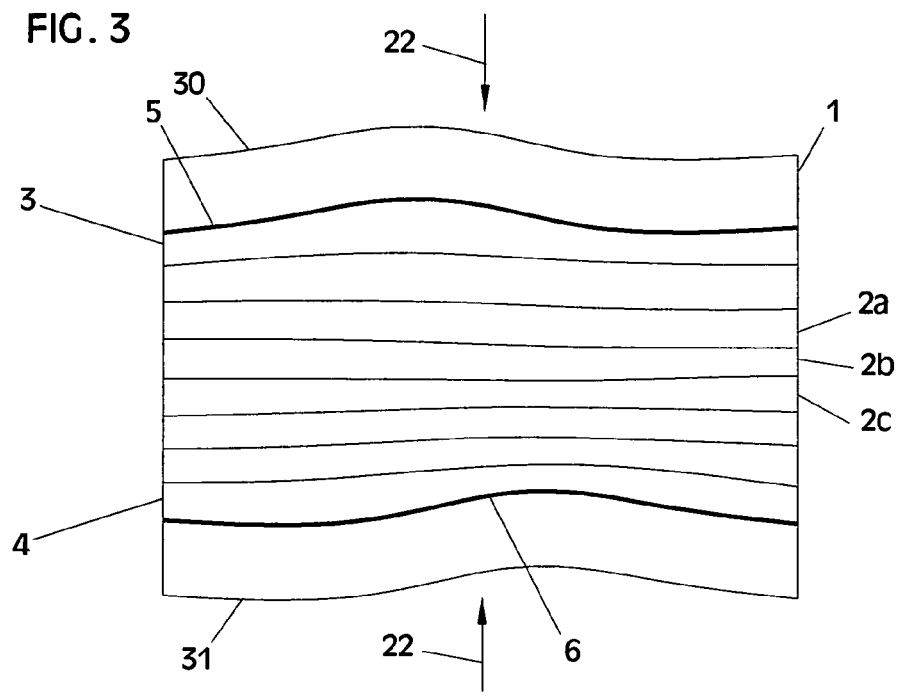
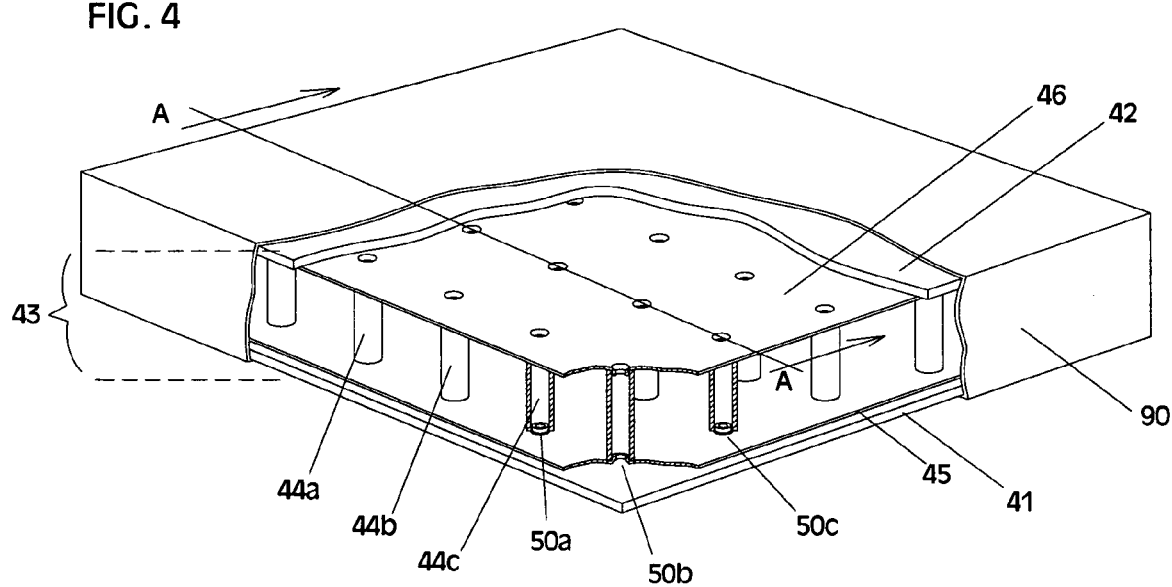

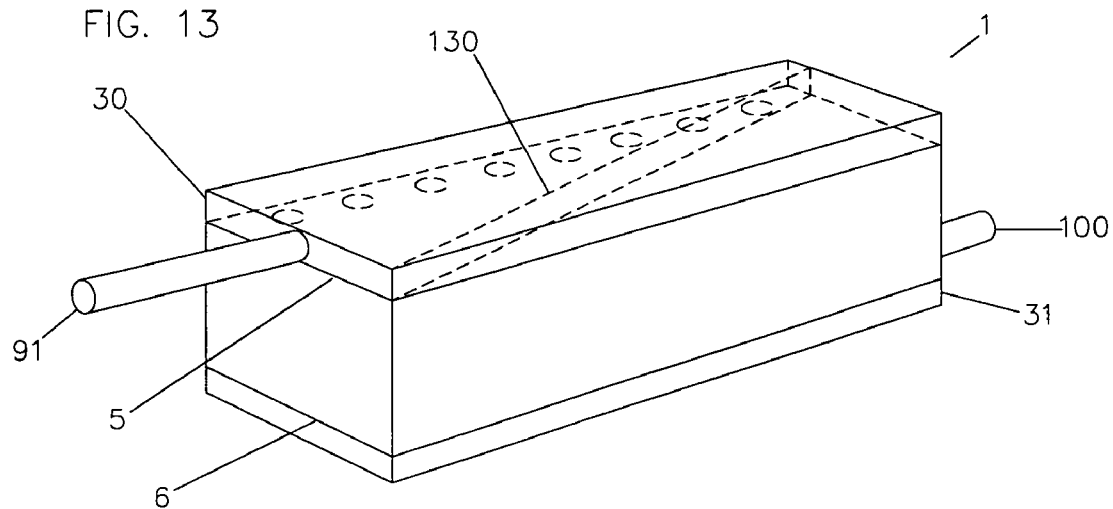
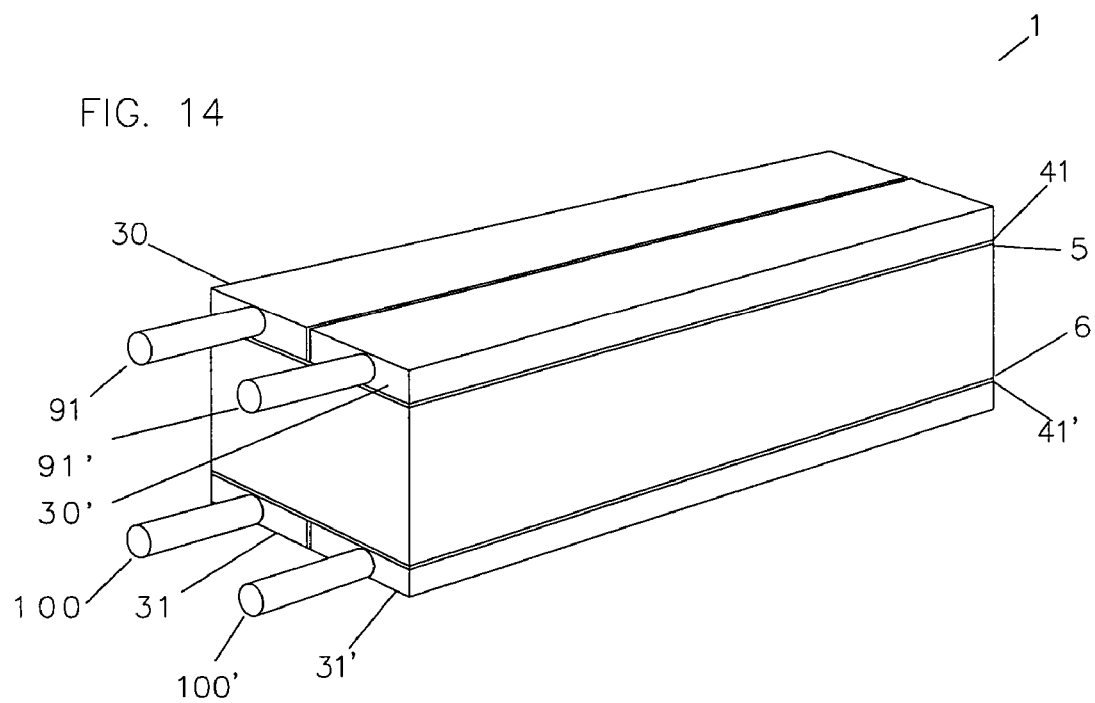

FUEL CELL END PLATE

PRIORITY CLAIM

This application claims the benefit of U.S. Provisional Application No. 60/439,156 filed on Jan. 10, 2003 and entitled "Fuel Cell End Plate Manifold," the entire disclosure of which is hereby incorporated herein by reference for all purposes.

FIELD OF THE INVENTION

The invention relates to fuel cells and to end plates for fuel cell stacks and to means to uniformly transmit compression forces through end plate assemblies into fuel cell stacks.

BACKGROUND

Fuel cell stacks include multiple individual fuel cells stacked to provide an electrical series relationship between individual cells. Fuel cell stacks further include end cells that act to terminate the stacked cells series relationships in opposing electrical poles, i.e. direct current positive and direct current negative end cells.

Individual cells of a fuel cell stack are generally produced with two major opposing surfaces that are substantially parallel to one another with a high degree of precision so that compression forces from the compression system are uniformly distributed to all of the major surfaces of each fuel cell of the fuel cell stack. However, in stacks containing a high number of fuel cells, major-surface parallelism tolerance accumulation can result in substantial non-parallelism at the terminal end cells of the fuel cell stack.

It is an object of the present invention to provide a fuel cell end plate for fuel cell stacks. It is a particular object of certain examples to provide a fuel cell end plate that is capable of complying with the shifting non-parallelism of the fuel cell stack while uniformly transmitting the compressive forces to the major surfaces of the end cells of fuel cell stack.

SUMMARY

In accordance with a first aspect, a fuel cell end plate comprising a first structural member and a second structural member and a plurality of vertical members connecting the first structural member and the second structural member is disclosed. The fuel cell end plate is configured to flex or to conform to a surface of a fuel cell to transmit substantially constant compressive force along the surface of the fuel cell, e.g., the end plate to conform to the surface of a fuel cell even if the parallelism of the fuel cell surface changes during operation of the fuel cell. In at least certain examples described below, the fuel cell end plate includes a first structural member connected to a second structural member through a plurality of hollow tubes that can distort or move to accommodate any non-parallelism of the fuel cell surface. In examples where the fuel cell end plate distorts or conforms to non-parallel surface of a terminal fuel cell, the first and second structural members of the end plate are substantially parallel to transmit substantially constant compressive force across the surface of the terminal fuel cells. Such a constant, uniformly compressive force is created by a distributed compression system such as the distributed compression system described in commonly held U.S. Pat. No. 6,670,069, entitled "Fuel Cell Stack Assembly," the entire disclosure of which is incorporated herein by reference. In other examples described below, the end plate further includes one or more alignment members in contact with a structural member of the end plate. In some examples, the alignment members include a protrusion, projection or nub to receive one end of the vertical members. In at least some examples described below, the vertical members are hollow tubes or columns.

In accordance with a second aspect, a fuel cell assembly comprising a fuel cell stack and at least one fuel cell end plate is disclosed. The fuel cell stack includes at least a first fuel cell and a second fuel cell in electrical communication with the first fuel cell. The fuel cell plate is configured to transmit substantially constant compressive force to the first surface of the first fuel cell of the fuel cell stack. In certain examples, a second fuel cell end plate is in contact with a surface of the second fuel cell to transmit substantially constant compressive force to the first surface of the second fuel cell of the fuel cell stack. In certain examples described below, the first and second fuel cell end plates each include a first structural member, e.g., a first structural sheet, connected to a second structural member, e.g., a second structural sheet, through a plurality of vertical members. In examples where the fuel cell end plate distorts or conforms to non-parallel surface of a terminal fuel cell, the structural members of the end plates are substantially parallel to transmit substantially constant compressive force across the surface of the terminal fuel cells. In other examples, the end plate(s) may also include one or more alignment members, e.g., alignment sheets, to facilitate assembly of the fuel cell end plate.

In accordance with an additional aspect, a molten carbonate fuel cell assembly a molten carbonate fuel cell stack and at least one fuel cell end plate is disclosed. The fuel cell stack includes a plurality of molten carbonate fuel cells stacked to provide an electrical series relationship between individual fuel cells. The fuel cell stack includes a cathode end cell and an anode end cell. The molten carbonate fuel cell assembly also includes a first fuel cell end plate configured to transmit substantially constant compressive force to an outer surface of the cathode end cell. In certain examples, the molten carbonate fuel cell assembly also includes a second fuel cell end plate configured to transmit substantially constant compressive force to an outer surface anode end cell. In at least certain examples described below, the first and second fuel cell end plates include a first structural sheet and a second structural sheet, a first alignment sheet in contact with the first structural sheet and a second alignment sheet in contact with second structural sheet, and a plurality of hollow tubes connecting the first alignment sheet and the second alignment sheet.

In accordance with a method aspect, a method of assembling a fuel cell end plate is disclosed. The method includes providing first and second alignment members each having spacers or projections at suitable positions, applying adhesive to ends of the vertical members and/or the spacers or projections on the alignment sheets, inserting a first end of the vertical members in the spacers or projections on the first alignment sheet and inserting a second end of the vertical members in the spacers or projections positioned on the second alignment sheet. In certain examples, fasteners are inserted into the alignment sheets to hold the assembly together.

It will be recognized by the person of ordinary skill in the art that the fuel cell end plates, and fuel cell assemblies including the fuel cell end plates, provide improvements not obtainable with prior art devices. Fuel cell end plates can be constructed to transmit substantially constant compressive forces along the surface of a fuel cell or fuel cell stack even when the terminal surfaces of the fuel cell stacks are non-parallel.

BRIEF DESCRIPTION OF THE FIGURES

Certain aspects and examples are described below with reference to the figures, in which:

FIG. 3 is a fuel cell stack is shown in side view comprising a plurality of individual cells, an anode end cell, a cathode end cell, an anode end plate and a cathode end plate, in accordance with certain examples;

FIG. 4 is an isometric cut-away of the end plate of FIG. 3, in accordance with certain examples;

FIG. 13 is an isometric view of another alternative embodiment of an assembled fuel cell stack.

FIG. 14 is an isometric view of yet another alternative embodiment of an assembled fuel cell stack.

Figure 1:
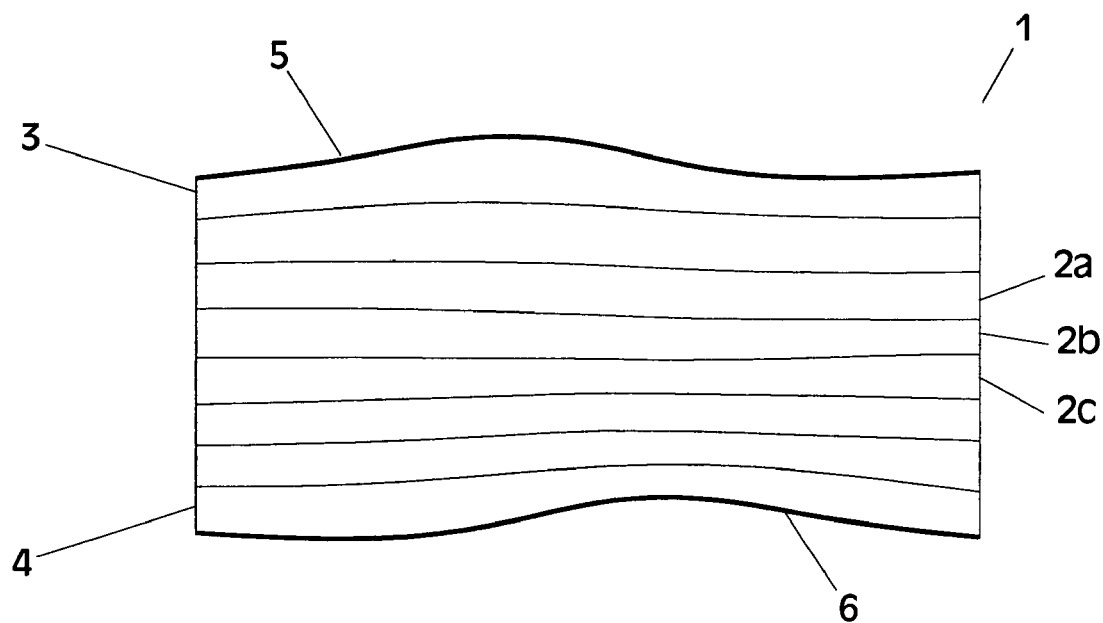
FIG. 1 is a fuel cell stack side view comprising a plurality of individual cells, an anode end cell, and a cathode end cell, in accordance with certain examples.

It will be recognized by the person of ordinary skill in the art that certain features or components in certain figures may have been exaggerated, enlarged or distorted relative to other features or components of the figures to facilitate understanding of the inventive subject matter disclosed herein.

DETAILED DESCRIPTION OF CERTAIN EXAMPLES

In accordance with certain examples, the fuel cell end plates disclosed here can flex, move or conform to a non-parallel or non-flat surface of a fuel cell to transmit substantially constant compressive force along the surface of the fuel cell. For example, without wishing to be bound by any particular scientific theory, during operation of a fuel cell or fuel cell stack, variations in thermal output can cause changes in the degree of parallelism of the terminal surfaces of the fuel cells in a fuel cell stack. Such changes in parallelism can cause a compressive device resting against a terminal fuel cell surface to exert uneven compression forces along the fuel cell surface which can result in poor connections between fuel cells in a fuel cell stack. Compressive forces are used to provide very close contact between adjacent cells for the benefit of low electrical resistivity and high inter-cell sealing integrity. The conformability of the fuel cell end plate disclosed here overcomes such limitations and transmits compressive forces which are substantially constant over the surface of terminal fuel cells. At least certain examples of the fuel cell end plates disclosed here act to transmit substantially constant compressive forces over the terminal surface of the fuel cell stack, and, in operation, the first and second structural members of the end plate are substantially parallel to transmit such substantially constant compressive force across the surface of the terminal fuel cells in a fuel cell stack.

In accordance with certain examples, a fuel cell end plate comprising a first structural member and a second structural member and a plurality of vertical members connecting the first structural member and the second structural member is disclosed. The first and second structural members are generally planar and may take numerous shapes and dimensions depending on the configuration of the fuel cell or fuel cell stack for which the end plate is to be used. In certain examples, the structural members are semi-flexible or flexible sheets. As used here, semi-flexible sheet means a sheet that can flex or distort at least to the extent necessary to conform to a non-parallel or no-flat surface of a fuel cell or a fuel cell in a fuel cell stack. For example, the parallelism of the fuel cell surface may change during operation of the fuel cell. The structural members are flexible enough that they may counter the shifting non-parallelism of the fuel cell or fuel cell stack. Additionally, the fuel cell end plates disclosed here are capable of complying with the shifting non-parallelism of the fuel cell or fuel cell stack so as to avoid concentrated and uneven compressive forces on the surface of the fuel cell or fuel cell stack, which may reduce the efficiency of the fuel cell stack.

In accordance with some examples, the structural members may include any suitable material that is capable of conforming to non-parallel surfaces of a fuel cell. For example, the structural members may include steel, ceramics, plastics, elastomers and combinations of these materials. In some examples, the materials in the structural members are selected depending on the type of fuel cell or fuel cell stack the end plate is to be used with. For example, in molten carbonate fuel cells, the structural members are typically steel, e.g., stainless steel such as 316 Stainless Steel, to withstand the high operating temperatures of the fuel cell. In other examples, the structural members are alloys or composites of materials. Suitable materials for use in the structural members will be readily selected by the person of ordinary skill in the art, given the benefit of this disclosure. The dimensions and thicknesses of the structural members will also typically vary depending on the area of the fuel cell as well as the type of fuel cell or fuel cell stack the end plate is to be used with, as well as the degree of compressive force to be applied to the fuel cell stack by the compression system. In certain examples, the structural member is about 1 mm (0.04 inches) to about 7.5 mm (0.3 inches) thick, more preferably about 2.5 mm (0.1 inches) to about 5 mm (0.2 inches) thick, and most preferably about 3 mm (0.12 inches) to about 4 mm (0.16 inches) thick, e.g., about 3.175 mm (0.125 inches) thick. However, depending on the type of material selected for the structural members, the thickness may be greater or lesser than the exemplary thicknesses disclosed above. It will be within the ability of the person of ordinary skill in the art, given the benefit of this disclosure, to select suitable thicknesses for the structural members.

In accordance with certain examples, the vertical members of the fuel cell end plate are hollow tubes or hollow columns which are configured to connect the structural members. In certain examples, a first end of the vertical member sits on or against one of the structural members and a second end of the vertical member sits on or against the second structural member. In examples where the vertical members are hollow tubes or hollow columns, the longitudinal axis of the hollow tubes is perpendicular to the surface of the structural members. The structural members may include raised projections, ridges, protrusions, bulges, nubs, etc. that are designed to the ends of the vertical members. Such raised projections, ridges, protrusion, bulges, nubs, etc. may include one or more adhesives to attach the vertical members to the structural members. In examples where the vertical members are hollow tubes or hollow columns, the hollow tubes are inserted into the projections of the structural member and may optionally be held in place with adhesive. In other examples, the vertical tubes are attached to the structural members using fasteners, couplers, springs or the like. In all cases of attachment, the method of attachment should avoid limiting the ability of the structural members to comply with the non-parallelism of the fuel cell stack. If adhesive is used to attach the vertical members to the structural members, the adhesive may contain one or more elastomers such that the vertical member can distort or move slightly to assist in accommodating the non-parallelism of the surfaces of a fuel cell. Suitable materials for use in the vertical members will be readily selected by the person of ordinary skill in the art given the benefit of this disclosure, and exemplary materials include, but are not limited to, steel, plastics, ceramics and combinations of these materials. In all examples, the materials of the vertical members can withstand the compressive forces used to compress the fuel cell or fuel cell stack. The exact size and dimensions of the vertical members may vary depending on the materials selected for the structural members, vertical members, etc. Exemplary dimensions for the vertical members include, but are not limited to, about 25 mm (0.1 inches) to about 76 mm (0.3 inches) in diameter, about 2.5 mm (0.01 inches) to about 12.5 mm (0.05 inches) wall thickness, and about 19 mm (0.75 inches) to about 51 mm (2 inches) in length. In at least one example where the vertical members are hollow tubes, the dimensions typically are about 6.4 mm (0.25 inches) in diameter by 0.9 mm (0.035 inches) wall thickness by about 31.75 mm (1.25 inches) in length. Other suitable dimensions will be readily selected by the person of ordinary skill in the art, given the benefit of this disclosure.

In accordance with certain examples, the exact number of vertical members included in a fuel cell end plate may vary depending on the material selected for the vertical members. Where the vertical member materials are highly resistant to compressive forces, fewer vertical members may be used. Where the vertical member materials are less resistant to compressive forces, more vertical members may be used. In certain examples, the vertical members are spaced about 25 mm (1 inch) to about 37.5 mm (1.5 inches) apart in the lengthwise direction of the fuel cell end plate and about 19 mm (0.75 inches) to about 32 mm (1.25 inches) apart in the width direction of the fuel cell end plate. It will be within the ability of the person of ordinary skill in the art, given the benefit of this disclosure, to select suitable numbers of vertical members for use in the fuel cell end plates disclosed here. In accordance with certain examples, in an assembled fuel cell end plate, void space is created between the vertical members. As discussed below, this void space may contain catalysts, baffles, ducts, and the like.

In accordance with certain other examples, the fuel cell end plate may also include alignment members to facilitate assembly of the fuel cell end plate. An alignment member may take numerous forms, such as a sheet of semi-flexible or flexible material. An alignment member may include projections, protrusions, nubs, ridges, etc. to receive the vertical members. The alignment member may be attached to the structural member, e.g., through one or more adhesive layers, or can rest against the structural member without any intervening adhesive layer. In certain examples, the end plate includes two alignment members where each structural member has an associated alignment member. In other examples, three alignment members can be used. In examples including three alignment members, one of the alignment members includes holes or openings of a suitable shape and size for insertion of the vertical members. For examples, in assembly of a fuel cell end plate that include three alignment members, a first alignment member rests against a structural member. Vertical members may be inserted through the opening of a third or intermediate alignment member and into the raised projection of the first alignment member. The third alignment member acts to keep the vertical members in a substantially vertical position such that a second alignment member can be placed on top of the vertical members to provide an assembled fuel cell end plate. Exemplary methods for assembling such fuel cell end plates having three alignment members are discussed below.

In accordance with other examples, the fuel cell end plate can include one or more inlets for introducing one or more reactants into the fuel cell end plate. In examples where the fuel cell end plate includes an inlet, the flat surfaces of the alignment member and/or structural member may include openings or holes that allow the reactant to diffuse into the fuel cell. For example, a top surface of a fuel cell may include a plurality of openings for receiving reactant(s). The bottom surface of the fuel cell end plate may include corresponding openings in fluid communication with openings in the fuel cell. Reactants may be introduced into the fuel cell end plate and can enter the fuel cell through the openings. In certain examples, each of the fuel cells of a fuel cell stack has a suitable opening(s) to allow reactant to flow from the fuel cell end plate to each of the fuel cells in the fuel cell stack. In examples where an inlet in the fuel cell end plate is used to introduce reactant into the fuel cell, a weld may be applied to the periphery of the inlet between the terminal cell and the end plate to minimize loss of reactant. In certain examples, a conformable gasket may be used between the fuel cell end plate and the fuel cell to minimize loss of reactant. Suitable conformable gaskets will be readily selected by the person of ordinary skill in the art, given the benefit of this disclosure. Exemplary gaskets vary by fuel cell operating temperature and may include steel gaskets, plastic gaskets, mineral gaskets and the like. In some examples, the fuel cell end plate may include an outlet for exiting of gases from the fuel cell stack.

In accordance with certain examples, inlets in the fuel cell end plate may be configured into a manifold. For example, reactants can be introduced into the fuel cell end plate through a first inlet tube or conduit and a series of internal tubes or conduits may split from the first inlet tube to distribute reactant to the fuel cells of the fuel cell stack. Similarly, a fuel cell end plate may contain a similar manifold for exiting of gases from the fuel cell stack. It will be within the ability of the person of ordinary skill in the art, given the benefit of this disclosure, to design suitable manifolds for use with the fuel cell end plates disclosed here.

In accordance with certain other examples, two or more fuel cell end plates may be stacked on each other and the resulting assembly placed on a fuel cell or fuel cell stack. The use of stacked fuel cell plates may be advantageous where more than one type of reactant is introduced into a fuel cell or fuel cell stack. For example, the innermost fuel cell end plate can be in fluid communication with one set of internal manifolds for introduction of one reactant to a fuel cell or fuel cell stack. The outermost fuel cell end plate can be in fluid communication with another set of internal manifolds for introducing another reactant into the fuel cell or fuel cell stack or for introducing a coolant into the fuel cell or fuel cell stack. In certain examples, two fuel cell end plates are stacked and placed on one side of a fuel cell or fuel cell stack and two additional fuel cell end plates are stacked and placed on the opposite side of the fuel cell or fuel cell stack. Additional fuel cell end plates may also be used. Given the benefit of this disclosure, the person of ordinary skill in the art will be able to select suitable numbers of fuel cell end plates for use in fuel cell assemblies disclosed here.

In accordance with other examples, one or more catalysts may be placed within the void space of the fuel cell end plate for purposes of promoting various chemical reactions with the reactants. The catalysts may be in loose form, e.g., powders, pellets, etc. or may be coated on the various components of the fuel cell end plates, e.g., coated on the vertical members, the alignment members and/or the structural members. The nature and amount of catalyst typically depends on the reactant introduced into the fuel cell end plate and/or the type of fuel cell that the end plate is used with. It will be within the ability of the person of ordinary skill in the art, given the benefit of this disclosure, to select suitable catalysts to promote a desired chemical reaction within the fuel cell end plate.

In accordance with other certain examples, baffles or ducts may be placed within the void space of the fuel cell end plate for directing the flow of reactants or coolants and influencing flow distribution of reactants or coolants in the end plate. The baffles may be integrated into the structural members, alignment members and/or the vertical members or may be inserted into the void space during assembly of the fuel cell end plate.

In other preferred embodiments the entire fuel cell end plate including any enclosure may be separated into two or more separate components feeding specific internal manifolds of a fuel cell stack. For example, one half of the fuel cell end plate may have a major fluid coupling in fluid communication with one set of internal manifolds, as in one set of inlet internal manifolds. A second half of the fuel cell end plate may have a major fluid coupling in fluid communication with another set of internal manifolds, as in another set of outlet internal manifolds. In certain examples, each half of the endplate is fully enclosed by respective enclosures.

In accordance with other examples, a fuel cell assembly comprising a fuel cell stack and at least one fuel cell end plate is disclosed. In at least some examples, fuel cell stacks are comprised of a plurality of individual fuel cells stacked so as to provide an electrical series relationship between individual cells. The fuel cell stacks may further comprise end or terminal cells that act to terminate the stacked cells series relationships in opposing electrical poles, i.e. direct current positive and direct current negative end cells. The fuel cell stacks can further comprise end plates adjacent end cells for the benefit of removal and introduction of product electrical current. In some examples, the fuel cell stacks further comprise one or more manifolds for the benefit of uniformly introducing and removing reactant gases to each cell of the fuel cell stack. Manifolds may be installed to the external sides of the fuel cell stack for externally manifolded fuel cells. Manifolds may also be installed in the end plates of the fuel cell stack for internally manifolded fuel cells. In some examples, fuel cell stacks further comprise a thermal barrier for containing thermal energy for the benefit of maintaining an optimum and uniform operating temperature. Thermal barriers include but are not limited to foam, thermal insulation that surrounds the fuel cell stack, etc.

In accordance with certain examples, the individual fuel cells of a fuel cell stack are generally produced with two major opposing surfaces that are substantially parallel to one another with a high degree of precision so that compression forces from the fuel cell end plates are uniformly distributed to all of the major surfaces of each cell of the fuel cell stack. However, in stacks containing a high number of fuel cells, major-surface parallelism tolerance accumulation can result in substantial non-parallelism at the terminal end cells of the fuel cell stack. For example, the fuel cell stack under normal operating conditions produces thermal energy in addition to the electrical energy. The electrical energy produced by the cells of the fuel cell stack generally is not produced uniformly across the major surfaces of the cells. As a result, the thermal energy is also not produced uniformly across the major surfaces of the cells. Non-uniform thermal energy generation results in non-uniform thermal expansions that further contribute to substantial non-parallelism at the terminal end cells of the fuel cell stack. Thermal energy produced during normal operating conditions of the fuel cell requires removal by cooling means. Flowing a coolant medium through the fuel cell stack, or, increasing the flow of reactants through the fuel cell stack can assist in removal of excess thermal energy from the stack. However, coolant flow through the stack will result in thermal gradients across the major surfaces of the cells of the fuel cell stack. Coolant induced thermal gradients also contribute to non-uniform thermal expansions that further contribute to substantial non-parallelism at the major surfaces of the terminal end cells of the fuel cell stack. While proper design and manufacture of the fuel cell stack can reduce the non-parallelism at the terminal end cells of the fuel cell stack, given the broad range of operating conditions that are desirable for commercial applications of fuel cells, it is very difficult to design the fuel cell stack in a manner that avoids non-parallelism at the terminal end cells of the fuel cell stack. Additionally, as fuel cell operating conditions are routinely changed and as mechanical compressive forces induce creep in individual cell components over time, it can be expected that the degree of non-parallelism of major surfaces at the terminal end cells of the fuel cell stack can be constantly shifting. Use of the fuel cell end plates provided here can overcome the drawbacks of using rigid and non-conforming compression devices in fuel cell stacks.

In accordance with certain examples, the fuel cell end plate of the fuel cell assembly typically includes structural members connected by vertical members as discussed above. In at least certain examples, the fuel cell end plate of the fuel cell assembly include a first structural member in contact with a first alignment member and a second structural member in contact with a second alignment member. The fuel cell end plate also includes vertical members which connect the first and second alignment members. Optionally, the fuel cell end plate can include an enclosure or housing which contains the components. The fuel cell end plate can also include an inlet for introducing one or more reactants into the fuel cell end plate. In examples where the fuel cell end plate includes an inlet, the flat surfaces of the alignment member and/or structural member may include openings or holes that allow the reactant to diffuse into the fuel cell. For example, a top surface of a fuel cell may include a plurality of openings for receiving reactant(s). The bottom surface of the fuel cell end plate may include corresponding openings in fluid communication with the openings in the fuel cell. Reactants may be introduced into the fuel cell end plate and can enter the fuel cell through the openings. In examples where an inlet in the fuel cell end plate is used to introduce reactant into the fuel cell, a conformable gasket may be used between the fuel cell end plate and the fuel cell to minimize loss of reactant. Suitable conformable gaskets will be readily selected by the person of ordinary skill in the art, given the benefit of this disclosure. Exemplary gaskets vary by fuel cell operating temperature and may include steel gaskets, plastic gaskets, mineral gaskets and the like. The fuel cell end plate may also include suitable outlets for existing of gases from the fuel cell stack.

In accordance with certain examples, a fuel cell assembly may include a fuel cell end plate in contact with a cathode end cell and a fuel cell end plate in contact with an anode end cell. The fuel cell end plates may be the same or may be different. For example, the fuel cell end plate in contact with the cathode end cell may include different materials or components than the fuel cell end plate in contact with the anode end cell. In some examples, one of the fuel cell end plates can be used as a current collector. It will be within the ability of the person of ordinary skill in the art, given the benefit of this disclosure, to select suitable materials and components for the fuel cell end plates for use with fuel cell stacks. In accordance with certain examples, each of the fuel cell end plates includes a first structural member, e.g., a first structural sheet, connected to a second structural member, e.g., a second structural sheet, through a plurality of vertical members. In other examples, the end plate(s) may also include one or more alignment members, e.g., alignment sheets, to facilitate assembly of the fuel cell end plate.

In accordance with additional examples, a molten carbonate fuel cell assembly a molten carbonate fuel cell stack and at least one fuel cell end plate is disclosed. The fuel cell stack includes a plurality of molten carbonate fuel cells stacked to provide an electrical series relationship between individual fuel cells. The fuel cell stack includes a cathode end cell and an anode end cell. The molten carbonate fuel cell assembly also includes a first fuel cell end plate configured to transmit substantially constant compressive force to an outer surface of the cathode end cell. In certain examples, the molten carbonate fuel cell assembly also includes a second fuel cell end plate configured to transmit substantially constant compressive force to an outer surface of the anode end cell. The first and second end plates include those components discussed above, e.g., structural members, vertical members and optionally alignment members.

Figure 2:
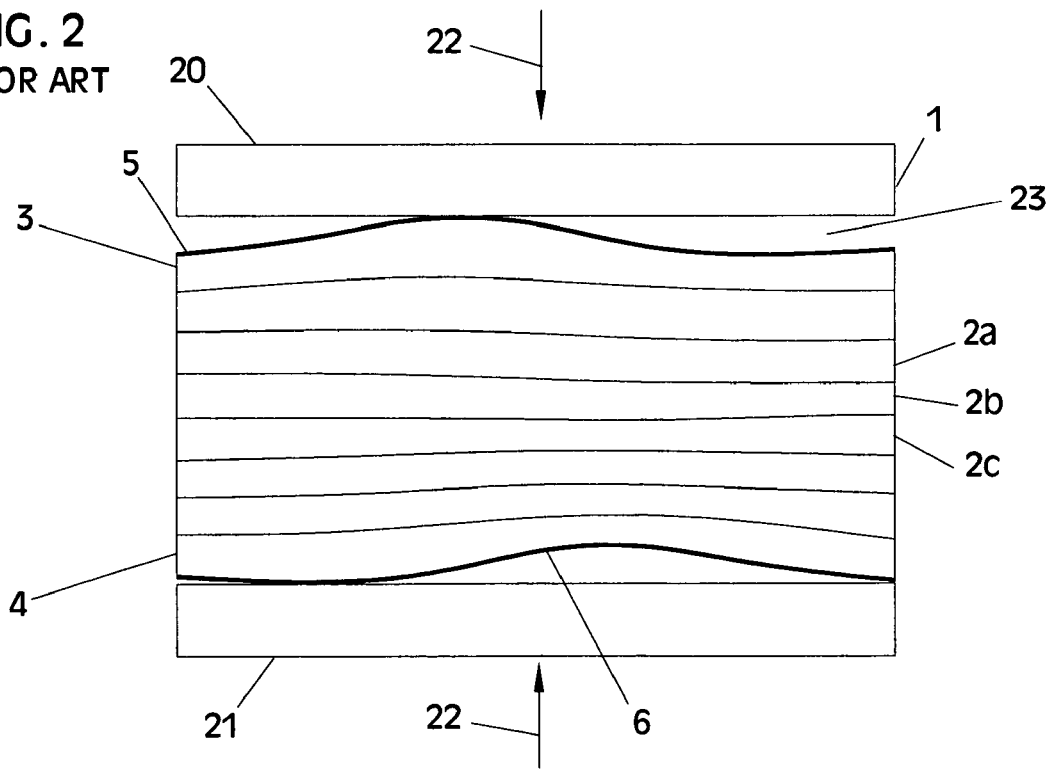
FIG. 2 is a fuel cell stack is shown in side view comprising a plurality of individual cells, an anode end cell, a cathode end cell, a prior art anode end plate and a prior art cathode end plate.

In accordance with certain examples and referring to FIG. 1, a fuel cell stack 1 is shown in side view comprising a plurality of individual cells 2a, 2b, and 2c, an anode end cell 3, and a cathode end cell 4. In the example of the fuel cell stack shown in FIG. 1, the outer surfaces of the terminal fuel cells are substantially non-parallel. For example, surfaces 5 and 6 are substantially non-parallel. As discussed above, such non-parallelism can result from expansion of the fuel cell surfaces during operation of the fuel cell stack. Also as discussed above, use of existing compression devices can result in uneven compression forces across surfaces 5 and 6 of fuel cell stack 1. Such uneven compression forces can decrease the efficiency of the fuel cell stack. For example, referring now to FIG. 2, a fuel cell stack 1 is shown in side view comprising a plurality of individual cells 2a, 2b, and 2c, an anode end cell 3, a cathode end cell 4, a prior art anode end plate 20 and a prior art cathode end plate 21. The outer surfaces 5 and 6, which are in contact with anode end plate 20 and cathode end plate 21 respectively, are substantially non-parallel. The prior art end plates are unable to conform to the non-parallel surfaces. Without wishing to be bound by any particular scientific theory, when compressive force is exerted by the prior art end plates 20 and 21 onto the fuel cell stack, surfaces of the terminal fuel cells that are higher will receive more compressive force than surfaces that are lower. For example, at gap 23 there is little mechanical pressure because of the non-conformity of end plate 20 with outer surface 5 of anode end cell 3.

In accordance with certain other examples and referring to FIG. 3, a fuel cell stack 1 is shown in side view comprising a plurality of individual cells 2a, 2b and 2c, an anode end cell 3, a cathode end cell 4, an anode end plate 30 in accordance with certain examples of the fuel cell end plate disclosed here, and a cathode end plate 31 in accordance with certain examples of the fuel cell end plate disclosed here. Even though opposing surfaces 5 and 6 of the end cells are substantially non-parallel, the conforming ability of end plates 30 and 31 are capable of uniformly providing compression forces 22 to the fuel cell stack 1. There are substantially no areas of low mechanical pressure or physical gaps seen at areas where the non-parallelism has accumulated. The surfaces of the ends plates 30 and 31 remain substantially parallel even when the end plates are attached to the non-parallel terminal surfaces of the fuel cell stack. Anode end plate 30 and cathode end plate 41 may include those components discussed above for the fuel cell end plates, e.g., structural members, vertical members and/or alignment members and may also include other suitable components selected by the person of ordinary skill in the art, given the benefit of this disclosure.

In accordance with certain examples and referring to FIG. 4, an isometric cut-away of anode end plate 30 of FIG. 3 is shown comprising first and second opposing structural members 41 and 42 separated by structure 43 comprising a plurality of vertical members 44a, 44b, and 44c and alignment members 45 and 46. In the examples shown in FIG. 4, the structural members and the alignment members are each substantially planar sheets and the vertical members are hollow tubes or hollow columns. Structure 43 is contained within an enclosure 90. Vertical members 44a, 44b and 44c are located over projections or protrusions 50a, 50b and 50c pierced through alignment members 45 and 46. In the examples shown in FIG. 4, the thickness of the first and second opposing structural members 41 and 42 are selected to deflect minimally or distort between adjacent vertical members under compressive mechanical load. The degree of deflection can be selected based upon the adjacent fuel cell stacks ability to tolerate non-uniformity of compression. For example, a molten carbonate fuel cell may tolerate inter-vertical member deflections of the structural sheet of about 0.05 mm (0.002 inches). The wall thickness of the vertical members can be selected to avoid buckling under compressive mechanical load.

The materials of the vertical members, structural members, alignment members, and enclosure can be selected to avoid corrosion of the material in the environments created by the fuel cell type into which they are installed. For example, 316 stainless steel can be used in end plates used with molten carbonate fuel cells. In some examples, the structural members, vertical members and/or alignment members can be coated with a catalyst in order to promote various chemical reactions with the reactants. In other embodiments, a catalyst in a loose form such as pellets, powder, etc. may be disposed within the fuel cell end plate. The nature and amount of catalyst typically depends on the reactant introduced into the fuel cell end plate and/or the type of fuel cell that the end plate is used with. It will be within the ability of the person of ordinary skill in the art, given the benefit of this disclosure, to select suitable catalysts to promote a desired chemical reaction within the fuel cell end plate. In other embodiments, the structural members, vertical members and/or alignment members may be coated with a substantially non-reactive substance, such as Teflon®, for example, to prevent unwanted reactions of reactants with the components of the fuel cell end plates. It will be within the ability of the person of ordinary skill in the art, given the benefit of this disclosure, to select suitable materials and/or suitable coatings to prevent reacting of the components of the fuel cell end plates with the fuel cell reactants.

Figure 5:
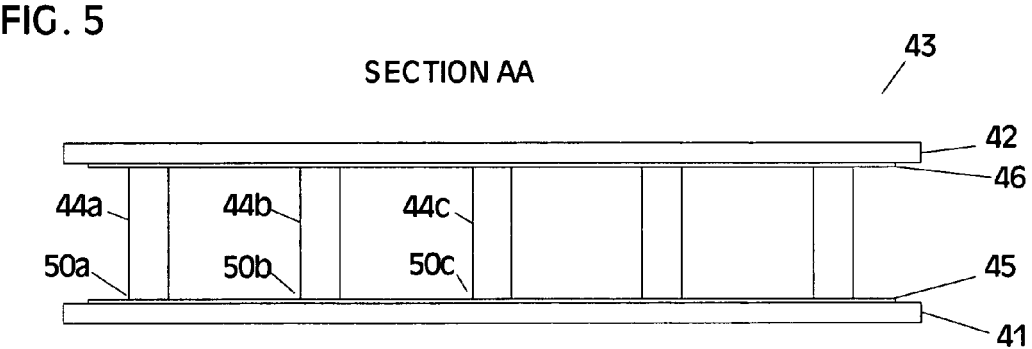
FIG. 5 is a cross-section taken at line AA of FIG. 4, in accordance with certain examples.

In accordance with additional examples and referring to FIG. 5, a cross-section taken at line AA of FIG. 4 is shown comprising a cross-section of the structure of a plurality of vertical members 44a, 44b and 44c, first and second opposing structural members 41 and 42 and alignment members 45 and 46. The plurality of vertical members comprise hollow tubes or columns having opposing first and second open ends engaging a plurality of protrusions 50a, 50b and 50c extending from the inner surfaces of opposing first and second alignment members 45 and 46. Protrusions 50a, 50b and 50c provide a locating site for each end of vertical members 44a, 44b and 44c, respectively. As seen in FIG. 5, void space exists between the vertical members. As discussed above, such void space can be filled with catalysts, baffles, ducts, or other suitable devices depending on the intended use of the void space.

Figure 6:
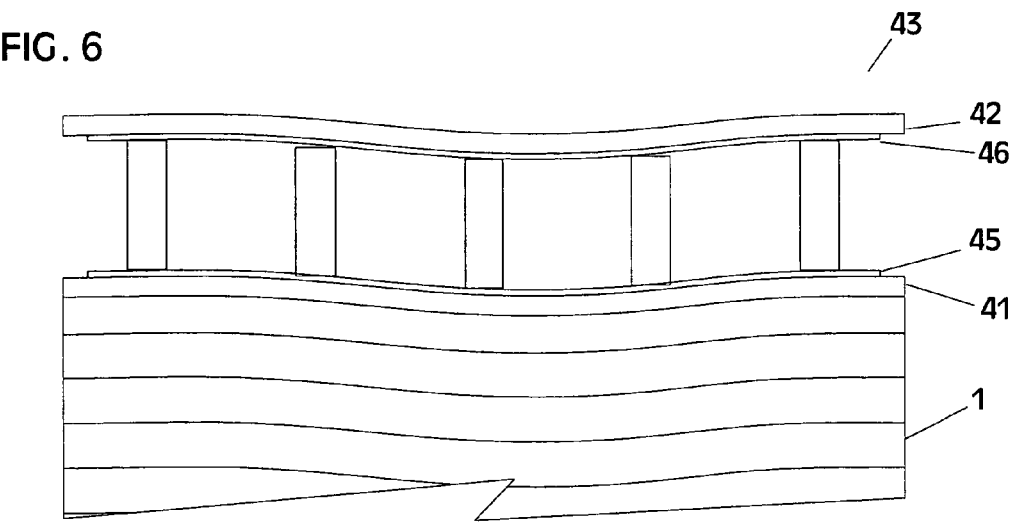
FIG. 6 is a side view of end plates, in accordance with certain examples.

In accordance with other examples and referring to FIG. 6, a side view of end plate structure 43 shows that the end plate has been distorted due to accumulated non-parallelism of an adjacent fuel cell stack 1. Without wishing to be bound by any particular scientific theory, as the temperature of a fuel cell is increased during operation of the fuel cell, the surfaces of the fuel cell can expand unevenly. First and second opposing structural sheets 41 and 42 of the fuel cell end plate have remained substantially parallel to one another despite the induced distortion. In at least certain examples, the ability of the structural sheets to remain substantially parallel results in substantially parallel compression forces across the surface of the fuel cell. Such a substantially parallel compressive force is created by a distributed compression system such as the distributed compression system described in commonly held U.S. Pat. No. 6,670,069 and entitled "Fuel Cell Stack Assembly," the entire disclosure of which is incorporated herein by reference.

Figure 7:
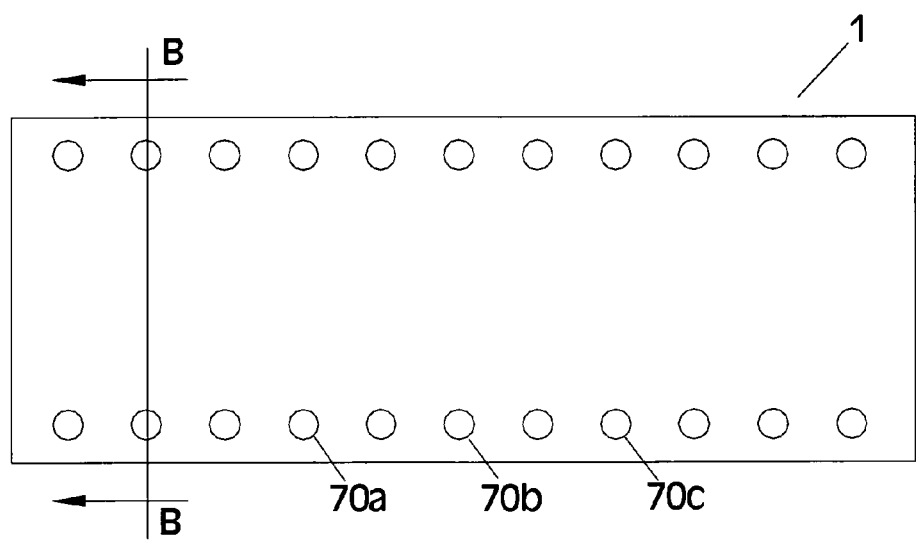
FIG. 7 is a plan view of a fuel cell stack including an array of internal reactant manifolds along an edge of a fuel cell, in accordance with certain examples.

In accordance with other examples and referring to FIG. 7, a plan view of a fuel cell stack 1 is provided showing an array of internal reactant manifolds 70a, 70b and 70c along one edge of the fuel cell stack 1. The reactant manifolds can be used for introducing reactants into the void space of the fuel cell end plate and/or into the fuel cells of the fuel cell stack. The manifolds may also be used to remove gases and/or introduce coolant into the fuel cells of the fuel cell stacks.

Figure 8:
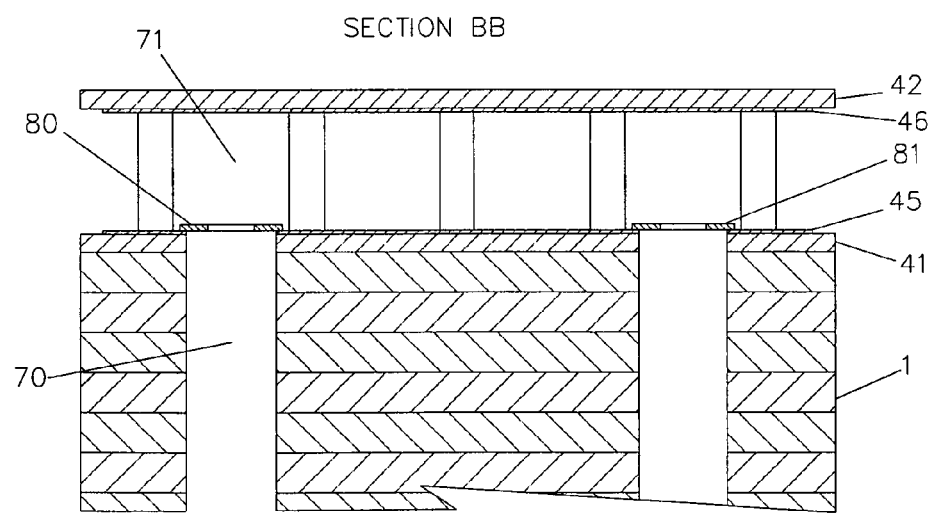
FIG. 8 is a cross-section taken at line BB of FIG. 7, in accordance with certain examples.

Referring now to FIG. 8, a cross-section taken at line BB of FIG. 7 is provided showing fluid communication between internal manifolds 70 of the fuel cell stack 1 and the void space 71 created between the opposing surfaces of the first and second opposing structural members 41 and 42. Internal manifolds 70 provide a conduit or pathway between the end plates and the fuel cells in the fuel cell stack. In certain examples, the fuel cell end plates may be divided into two sections, as described in greater detail below. Thus, one section can be used to introduce a first reactant to the fuel cell stack, and a second section can be used to introduce a second reactant or coolant into the fuel cell stack or to remove heat or waste products from the fuel cell stack.

In certain preferred embodiments, an orifice 80, 81 can be provided at the end of each internal manifold 70 through which reactants flow. Orifices 80, 81 serve to promote uniformity of reactant and coolant flow distribution to and from the various internal manifolds 70 in the fuel cell stack by controlling the flow of reactant and coolant.

Figure 9:
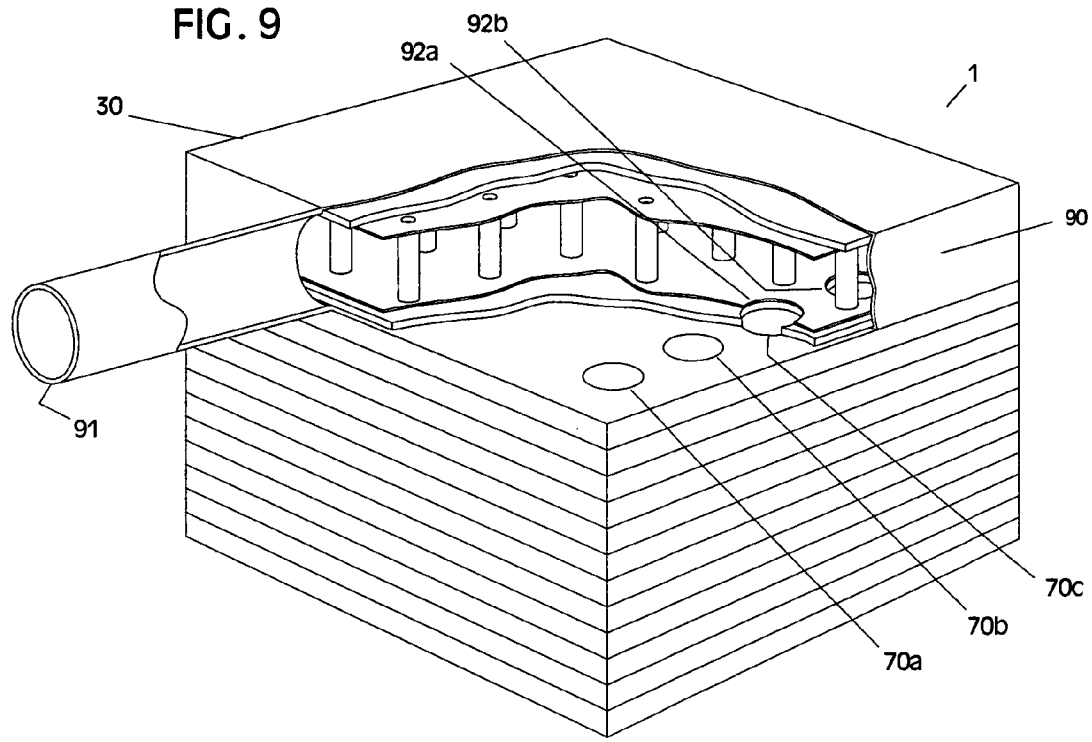
FIG. 9 is an isometric cut-away showing an end plate enclosed within an enclosure of sheet-like material, in accordance with certain examples

In accordance with an additional example and referring to FIG. 9, an isometric cut-away of a fuel cell stack 1 is provided showing fuel cell end plate 30 enclosed within enclosure 90 of sheet-like material. Enclosure 90 includes a major coupling 91 and a series of minor couplings 92a and 92b all in fluid communication with one another and with internal manifolds 70a, 70b and 70c of the adjacent fuel cell stack 1. In this example, the minor couplings of the fuel cell end plate are generally circular openings which sit adjacent to internal reactant manifolds and provide fluid communication between the voids of the fuel cell end plate and the internal reactant manifolds of the fuel cell stack. The exact shapes and size of the minor coupling may vary. For example, the minor couplings can be circular, rectangular, ovoid, trapezoidal, etc.

Figure 10:
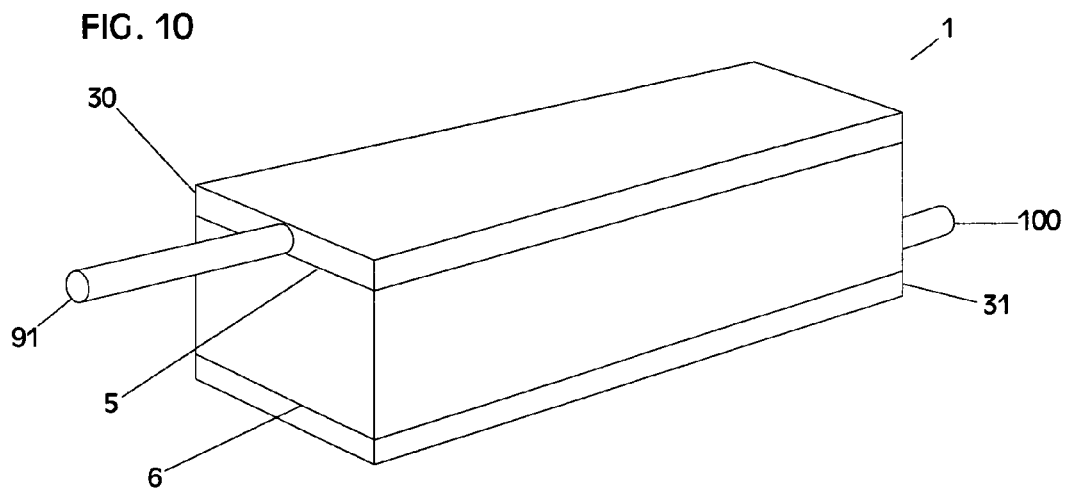
FIG. 10 is an isometric view of an assembled fuel cell stack, in accordance with certain examples.

In accordance with other examples and referring to FIG. 10, an isometric view of an assembled fuel cell stack 1 is provided showing a major inlet fluid coupling 91 and a major outlet fluid coupling 100 at end plates 30 and 31, respectively, on the opposing major surfaces 5 and 6 of the fuel cell stack 1. The fluid coupling can be used to introduce reactants into the fuel cell stack, introduce coolants into the fuel cell stack and/or remove heat, contaminants and/or waste products from the fuel cell stack. The exact dimensions of the couplings shown in FIG. 10 will vary depending on the desired fluid introduction rate and/or the available space. In certain examples, the fluid couplings have an inside diameter of about 1.5" and a length of about 6". The fluid coupling may be made of a suitable material, and, in certain examples, the fluid coupling is made of the same material as that of the fuel cell end plate and/or the fuel cell end plate enclosure.

Figure 11:
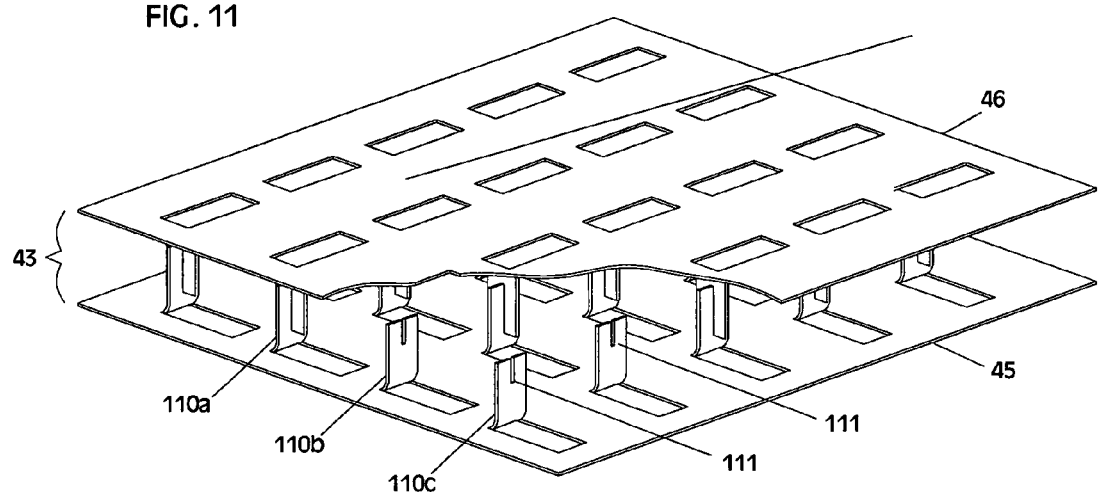
FIG. 11 is another example of an assembled fuel cell stack, in accordance with certain examples.

In accordance with other embodiments and referring to FIG. 11, another example of the internal structure 43 of a fuel cell end plate is shown in isometric cut-away where the hollow vertical members are replaced by a plurality of pairs of mating sheet metal tabs 110a, 110b and 110c. The sheet metal tabs of each pair are lanced upward and downward from one surface of each of the alignment members 45 and 46. Specifically, a first tab is lanced and folded upwardly from alignment member 45 and a mating second tab is lanced and folded downwardly from alignment member 46. The first tab is lanced at a 90° angle to the second tab, and a slot 111 is provided at the ends of the tabs such that the first tab engages the second tab.

Figure 12:
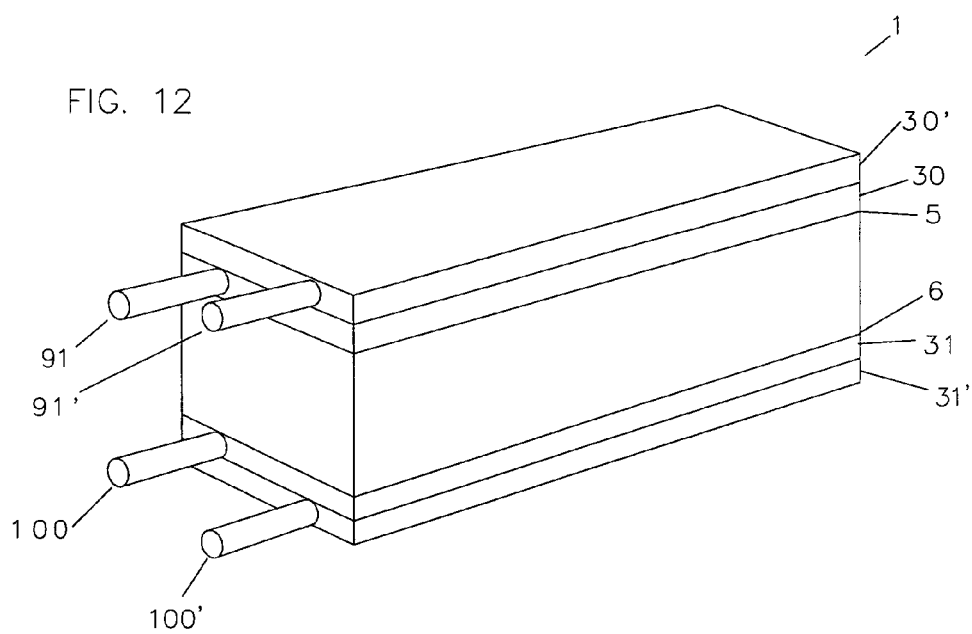
FIG. 12 is an isometric view of an alternative embodiment of an assembled fuel cell stack.

In accordance with certain other examples, two or more fuel cell end plates may be stacked on each other and the resulting assembly placed on a fuel cell or fuel cell stack, as illustrated in FIG. 12. As seen here, an inner or first fuel cell anode end plate 30 is placed in contact with surface 5 of fuel cell stack 1. An outer or second fuel cell anode end plate 30' is placed in contact with first fuel cell anode end plate 30.

Couplings 91, 91' are in fluid communication with first fuel cell anode end plate 30 and second fuel cell anode end plate 30', respectively. Similarly, an inner or first fuel cell cathode end plate 31 is placed in contact with surface 6 of fuel cell stack 1. An outer or second fuel cell cathode end plate 31' is placed in contact with first fuel cell cathode end plate 31. Couplings 100, 100' are in fluid communication with first fuel cell cathode end plate 31 and second fuel cell cathode end plate 31', respectively.

The use of stacked fuel cell plates may be advantageous where more than one type of reactant is introduced into a fuel cell or fuel cell stack. For example, the innermost first fuel cell end plates 30, 31 can be in fluid communication with one set of internal manifolds for introduction of one reactant to a fuel cell or fuel cell stack. The outermost second fuel cell end plates 30', 31' can be in fluid communication with another set of internal manifolds for introducing another reactant into the fuel cell or fuel cell stack or for introducing a coolant into the fuel cell or fuel cell stack. In the illustrated embodiment, two fuel cell end plates are stacked and placed on each side of fuel cell stack 1. Additional fuel cell end plates may also be used. Given the benefit of this disclosure, the person of ordinary skill in the art will be able to select suitable numbers of fuel cell end plates for use in fuel cell assemblies disclosed here.

In accordance with another embodiment, one or more baffles may be placed within the void space of the fuel cell end plates, as seen in FIG. 13. As illustrated here, a baffle 130 is positioned within fuel cell anode end plate 30. Baffle 130 serves to directing the flow of reactants or coolants and influence the flow distribution of reactants or coolants in end plate 30 between manifolds 70 and coupling 91. It is to be appreciated that any number of baffles may be incorporated in each end plate, and that the baffles may be of unitary construction with any of the structural members, alignment members and/or the vertical members, or may be inserted into the void space during assembly of the fuel cell end plate.

Another preferred embodiment is illustrated in FIG. 14, in which the fuel cell end plates are divided into multiple sections. In the illustrated embodiment, each fuel cell end plate is divided into two sections. Specifically, an anode end plate is formed of a first anode end plate section 30 and a second anode end plate section 30', and a cathode end plate is formed of a first cathode end plate section 31 and a second anode end plate section 31'. Couplings 91 and 91' are in fluid communication with first anode end plate section 30 and second anode end plate section 30', respectively, while couplings 100 and 100' are in fluid communication with first cathode end plate section 31 and second cathode end plate section 31', respectively.

For each end plate, the first section can be used to introduce a first reactant to the fuel cell stack, and the second section can be used to introduce a second reactant or coolant into the fuel cell stack or to remove heat or waste products from the fuel cell stack. In yet other examples, each end plate can be split into more than two sections, each of which can provide reactants, coolants, etc. It will be within the ability of the person of ordinary skill in the art, given the benefit of this disclosure, to provide fuel cell ends plates having a suitable number of sections for an intended use.

In accordance with certain embodiments, a method of assembling a fuel cell end plate is provided. The method includes providing a first and second structural member and placing a first alignment sheet on the first structural member. The first alignment sheet may include integral projections that extend away from the structural member or spacers may be placed on the alignment sheets to provide such projections. In examples where the fuel cell end plate does not include an alignment member, the projections maybe integrated into the structural member or spacer may be placed directly on the alignment member. If spacers are used, the spacers are laid out onto the first alignment member, or the structural member, at a distance to one another of about every 15 cm (6 inches) to about 25 cm (10 inches). In at least certain examples, the thickness of the spacers is roughly equivalent to one-half the length of the hollow columns, and the width of the spacers is roughly 50% to 75% of the distance between adjacent protrusions. Vertical members are placed on the alignment member by mating an open end of the vertical member with a projection on the alignment member or structural member. Additional vertical members can be placed on the alignment member until a desired number of vertical members are present. Optionally, a suitable amount of an adhesive can be sprayed or coated onto the projections of the alignment member to aid in retaining the vertical members. Optionally and prior to addition of a second alignment member, an intermediate alignment member can be slid over the vertical members to aid in correct placement of the second alignment member. The intermediate alignment member includes a plurality of through holes in substantially the same pattern as the protrusions of the first and second alignment members. The diameters of the through holes in the intermediate alignment member are slightly larger than the diameter of the hollow vertical members. In the alternative, the intermediate alignment member can be placed adjacent to the first alignment member and the vertical members can be inserted through holes of the intermediate alignment member.

In at least certain examples, the vertical members are inserted batchwise by placing the vertical members into a bin such that all of the vertical members are standing upward and are parallel to one another such that substantially only one end of the vertical members are exposed. An adhesive can be sprayed onto the exposed ends of the vertical members. The vertical members can be inserted into the through holes of the intermediate alignment sheet and engaged with the associated protrusion of the first alignment sheet. This process is continued until all of the vertical members are inserted into the first alignment member and the intermediate alignment member if present. After placing the desired number of vertical members, a second alignment member is placed opposite the first alignment member. The second alignment member includes projections that mate with a second open end of the vertical members. Adhesive may be coated or sprayed on the projections of the second alignment member prior to insertion of the vertical members into the projections of the second alignment sheet. The assembled end plate is lightly pressed by hand or suitable mechanical devices to ensure adhesive contact and weight or force is applied to the assembled end plate for a suitable time to allow the adhesive to cure. In a least some examples, for ease of use the assembled end plate is temporarily held together by the installation of fasteners, such as machine screws, through the first alignment member and into the second alignment member at selected protrusions. The fasteners can be removed prior to sealing the assembly into an enclosure or can be left in place. The spacers can be removed prior to use of the fuel cell end plate and the intermediate alignment member can be abandoned in place and allowed to drop to the bottom of the assembled fuel cell end plate.

In accordance with an additional example, the spacing of the vertical members, the wall thickness of the vertical members, the material thickness of the first and second opposing structural members, and the material selection of the vertical members and the first and second opposing structural members are selected so as to minimally distort under the compression forces of the compression system of the fuel cell stack. The person of ordinary skill in the art, given the benefit of this disclosure, will be able to select suitable parameters to render the distortions produced by compression insignificant or substantially minimal. For example, the exemplary values provided below can result in distortion less than 0.05 mm (0.002 inches) between vertical members in a molten carbonate fuel cell operated at 650° C. and 20-PSI stack compression: Vertical member dimensions: 6.35 mm (0.25 inches) diameter×0.89 mm (0.035 inches) wall thickness×31.75 mm (1.25 inches) length, opposing structural member thickness: 3.175 mm (0.125 inches), structural member and vertical member alloy: 316 Stainless Steel, and vertical member spacing: 27.05 mm (1.065 inches) by 23.60 mm (0.929 inches).

In accordance with certain examples, after assembly of the fuel cell end plate, the end plate is placed or pressed onto a terminal surface of a fuel cell stack. In certain examples, mechanical pressure, e.g., using a mechanical distributed compression system as described in commonly held U.S. Pat. No. 6,670,069 entitled "Fuel Cell Stack Assembly," is placed on the end plate to allow the end plate to conform to the uneven surfaces of the fuel cell stack. In certain examples, the end plate is placed on a fuel cell stack which is operating or has equilibrated to operating temperatures. In other examples, the end plate is placed on a fuel cell stack at room temperature. In at least certain examples, the end plate is placed on a fuel cell stack at room temperature, mechanical force is exerted on the top surface of the end plate (the surface opposing the surface in contact with the fuel cell surface), and the fuel cell stack is heated to operating temperature with continuous or semi-continuous application of mechanical force. Other potential methods of placing the fuel cell end plate on a fuel cell stack will be readily selected by the person of ordinary skill in the art, given the benefit of this disclosure.

In light of the foregoing disclosure of the invention and description of the preferred embodiments, those skilled in this area of technology will readily understand that various modifications and adaptations can be made without departing from the scope and spirit of the invention. All such modifications and adaptations are intended to be covered by the following claims.

What is claimed is:

1. A fuel cell assembly comprising:
   a fuel cell stack comprising at least a first fuel cell and a second fuel cell, the first fuel cell in electrical communication with the second fuel cell;
   a first fuel cell end plate comprising a first structural member and a second structural member connected to the first structural member through a plurality of vertical members, the first fuel cell end plate being in contact with a first surface of the first fuel cell of the fuel cell stack and configured to transmit substantially constant compressive force along the first surface of the first fuel cell of the fuel cell stack; and
   a second fuel cell end plate comprising a first structural member and a second structural member connected to the first structural member through a plurality of vertical members, the second fuel cell end plate being in contact with a first surface of the second fuel cell of the fuel cell stack and configured to transmit substantially constant compressive force along the first surface of the second fuel cell of the fuel cell stack;
   wherein each of the first fuel cell end plate and the second fuel cell end plate comprises a first alignment member in contact with a corresponding first structural member and a second alignment member in contact with a corresponding second structural member; and
   wherein each of the vertical members comprises a first tab lanced and folded from the first alignment member and a second tab lanced and folded from the second alignment member, each of the first tab and the second tab having a slot formed in an end thereof, the slot of the first tab engaging the second tab and the slot of the second tab engaging the first tab.

2. The fuel cell assembly of claim 1, wherein the first tab is disposed at an angle of 90° with respect to the second tab.

* * * * *